United States Patent [19]

Edwards

[11] Patent Number: 4,686,619
[45] Date of Patent: Aug. 11, 1987

[54] LOW DISSIPATION CAPACITOR VOLTAGE SHARING CIRCUIT FOR A STATIC AC/DC CONVERTER

[75] Inventor: Charles W. Edwards, Monroeville Boro, Pa.

[73] Assignee: Westinghouse Electric Corp., Pittsburgh, Pa.

[21] Appl. No.: 908,418

[22] Filed: Sep. 17, 1986

[51] Int. Cl.$^4$ .............................................. H02M 7/06
[52] U.S. Cl. ...................................... 363/126; 363/48
[58] Field of Search .................................. 363/44–48, 363/125, 126, 129, 130, 52–54

[56] References Cited

U.S. PATENT DOCUMENTS

| 4,212,054 | 7/1980 | Seki | 363/126 X |
| 4,555,751 | 11/1985 | Koga et al. | 363/126 X |
| 4,555,753 | 11/1985 | Takahashi | 363/126 |

Primary Examiner—Peter S. Wong
Attorney, Agent, or Firm—C. M. Lorin

[57] ABSTRACT

In an AC/DC converter, the dissipation voltage sharing resistors commonly placed in parallel with the series capacitors are replaced by a resistor balancing path derived from the capacitor junction point to a symmetrically disposed voltage reference point belonging to the AC input vectorial system.

4 Claims, 8 Drawing Figures

LOW DISSIPATION CAPACITOR VOLTAGE SHARING CIRCUIT FOR A STATIC AC/DC CONVERTER

BACKGROUND OF THE INVENTION

The invention is applicable to the field of static conversion where rectification and filtering of incoming AC power is intended to provide a smooth DC output. This is particularly the case in AC motor drives where the DC link voltage that must be filtered exceeds the rating of the electrolytic capacitors connected in series thereacross. The solution has been to connect in series several capacitors in order to achieve the required voltage capability. A problem arises in this situation. Since the capacitors are neither perfect nor identical, they have a leakage current that can widely vary from one capacitor to the next. Such difference in leakage current causes the capacitor having the lesser leakage to be charged to a voltage which can be unacceptable under the higher leakages of the other capacitors forming a series string therewith. The standard practice to cope with this unbalanced leakage problem has been to add resistors in parallel, one with each capacitor, or set of parallel capacitors mounted in series string, so as to absorb the leakage currents and maintain a voltage balance within a reasonable range. The value of such leakage current sharing resistors is determined from a consideration of the range of leakage current for each capacitor, the range of DC link voltage and the maximum allowable voltage unbalance.

Voltage balancing resistors in parallel to each capacitor of the string are undesirable for several reasons, among which cost and power dissipation are the main drawbacks. In addition, a hermetically closed housing for dust-tight application of an adjustable frequency AC motor drive becomes unacceptable because of the heat build-up with such resistors. An alternative is to minimize the heat loss inside the enclosure by choosing externally mounted long lead time single source resistors, an expensive solution.

SUMMARY OF THE INVENTION

The invention resides in substituting for parallel resistors, a resistance path derived from the capacitor midpoint on the DC-link capacitor string to a point on the AC line side which is disposed both between the AC line phases and between the DC-link terminals.

A practical implementation consists in providing an autotransformer between two of the AC phase lines and of tapping at the center thereof a connection to the midpoint between the DC-link capacitors. A resistor is connected therebetween so that a voltage appearing across such resistor which is an AC voltage superposed on a DC voltage offset which is due to the leakage currents of the series capacitor if these are unbalanced.

This approach to voltage balancing with a resistor has revealed that the rms voltage across such resistor is such that the total dissipation encountered with this solution is substantially lower than experienced with the prior art parallel resistor sharing network.

DETAILED DESCRIPTION OF THE INVENTION

Figure 1:
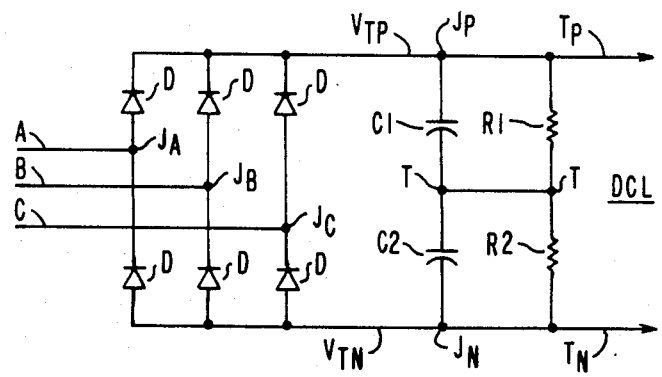
FIG. 1 is an AC/DC converter having series capacitor and parallel series resistors on the DC terminal side, as taught by the prior art.

Referring to FIG. 1, there is shown a voltage source supplied from an AC power supply (phases A, B and C) through a rectifier bridge (diode D) across DC terminals TP and TN. Rectification and filtering of the incoming AC power, to develop between terminals TP and TN a smoothed DC voltage under a relatively high voltage, requires a bank of capacitors in series thereacross. For the sake of illustration, two such capacitors C1, C2 are shown between junction points JP, on TP and JN on TN, with a midpoint T between the capacitors.

Since the capacitors are not perfect, they have a leakage current, depending upon the capacitors and aging of the components. The capacitor with the lower leakage in the string may become charged at an unacceptable level under the leakage of the other capacitors in the string. FIG. 1 shows common practice to cope with this problem. Resistors, such as R1 for C1 and R2 for C2, are added in parallel to overcome the leakage currents and maintain a voltage balance within a reasonable range. The values of the resistors R1 and R2 is determined by the leakage current for each capacitor, the DC link voltage and the maximum allowable imbalance.

Figure 2:
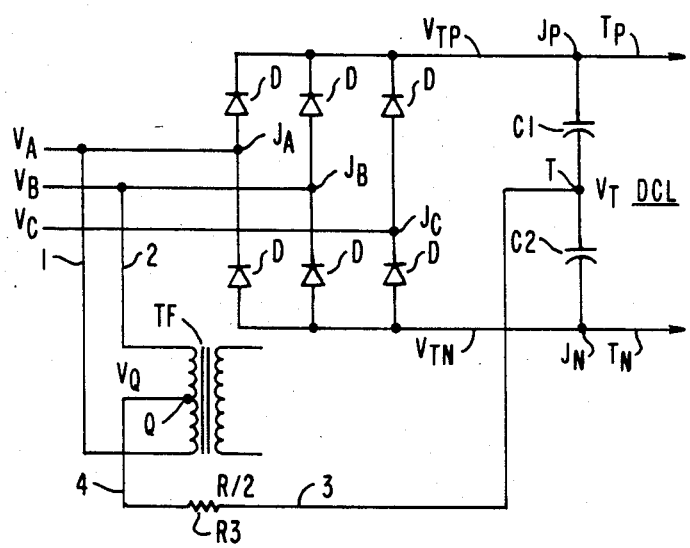
FIG. 2 is an AC/DC converter according to the invention.

Referring to FIG. 2, according to the present invention, a different solution than series resistors is proposed making use of a transformer TF having its primary winding connected by lines 1 and 2 to phase lines A and B, for instance, and a mid-tap point Q from which is derived on line 4 a balancing path, including a resistor R3 and a connecting line 3 to the mid-tap point T between the two capacitors C1 and C2.

Before analyzing the effect on the leakage current of resistor R3 of FIG. 2 as opposed to resistors R1, R2 of FIG. 1, a comparison can be made between the equivalent circuits of FIG. 3A for FIG. 1 and of FIG. 3B for FIG. 2, where the resistance of resistors R1 and R2 is assumed to be R for both, whereas resistor R3 requires only R/2, as will be shown hereinafter.

Figure 4A:
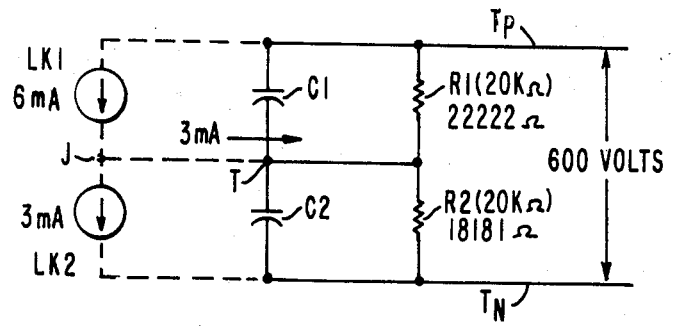
FIGS. 4A and 4B illustrate numerically the leakage paths in the circuits of FIGS. 3A and 3B, respectively.

FIG. 4A is a numerical illustration of the circuit of FIG. 1 where R1=R2=20KΩ, for a DC voltage of 600 volts across TP and TN. It is also assumed that across C1 there is a leakage of LK1 of 6 mA, and across C2 a leakage LK2 of 3 mA. This means that there is a leakage of 6 mA−3 mA=3 mA in the branch common to the capacitors and the resistors through which such loss is split. In order to match such unbalance, the resistance of R1 should be reduced from 20KΩ to 18180Ω, whereas the resistance of R2 should be increased from 20KΩ to 22,222Ω, thus resulting in a balanced distribution of voltage across C1 and C2.

Figure 4B:
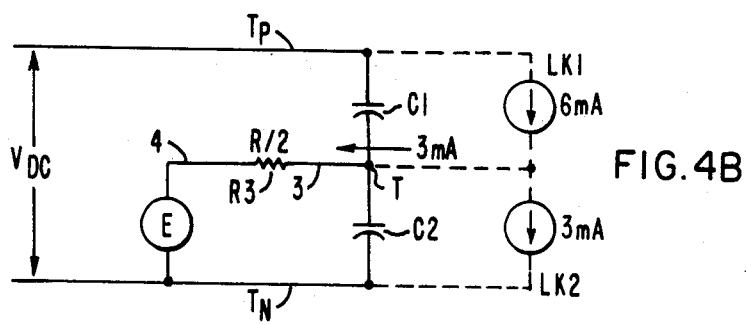

FIG. 4B schematizes the balancing path from mid-tap T through resistor R3 by a source E between line 4 and the negative terminal TN, with the 3 mA leakage in the central path determining the value of R3 to match such leakage derivation due to LK1 (6 mA) and LK2 (3 mA) as in FIG. 4A.

Figure 5:
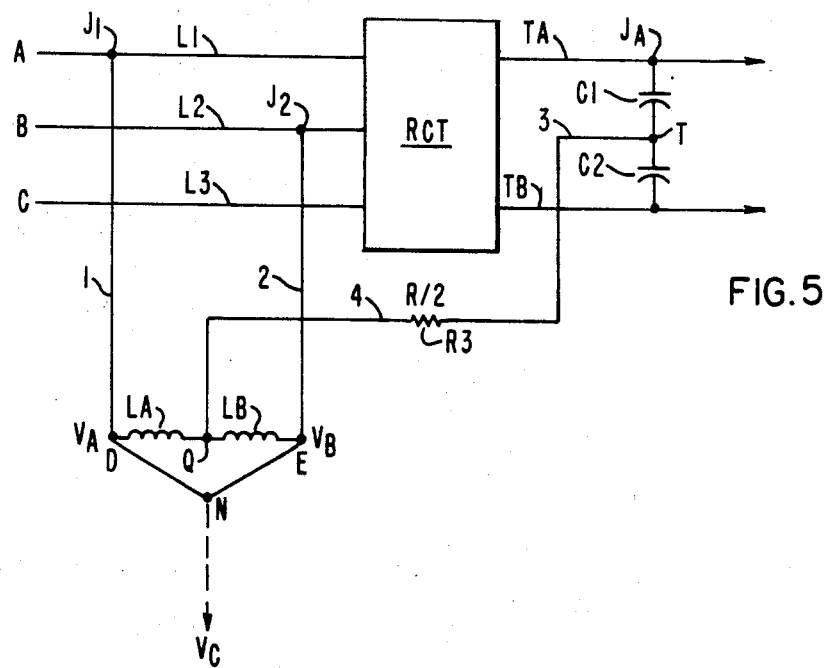
FIG. 5 is a block diagram showing more generally the circuit of FIG. 2.

Referring to FIG. 5, the balancing resistor path formed with lines 3 and 4 and resistor R3 is shown in a more generalized way by an autotransformer mounted between lines 1 and 2 of phases A and B. The two windings LA, LB have a midpoint Q. For the purpose of illustration, the phase-to-phase voltage ($V_A - V_B$) is shown applied to the end points D of LA and E of LB. Vectors $V_{AN}$ and $V_{BN}$ are shown as well as vector VCN by reference to a vertical neutral point N. Q is situated at the middle point of the base of triangle DNE.

It will be shown now that the voltage appearing across resistor R3 is an AC voltage superposed on a DC offset voltage, whenever the leakage currents of capacitors C1, C2 are unbalanced (3 mA in the example of FIGS. 4A, 4B). It will also be shown that the total dissipation of energy across balancing resistor R3 is substantially lower across the resistors R1 and R2 of the prior scheme of FIG. 1. The losses due to the AC component and the losses due to the DC component will be determined separately, then combined for the total hereinafter.

Considering first the rms value of the AC component of the resistor R3, the angular frequency is neglected since it does not affect the rms value. The diode voltage drops in the rectifier bride are also neglected, since the are negligible at the voltage levels under consideration (380–460 volts).

The following equations are in order for the voltage-to-neutral AC voltages:

$$V_{AN} = V \sin(t)$$

$$V_{BN} = V \sin(t - \phi)$$

$$V_{CN} = V \sin(t - 2\phi)$$

where $\phi = 2\pi/3$.

At the mid-tap point Q, the voltage $V_Q$ is $$\frac{V_{AN} - V_{BN}}{2} + V_{BN} = \frac{V_{AN} + V_{BN}}{2} = \tfrac{1}{2} V \sin(t - \pi/3)$$

For the specific ranges indicated, the voltage $V_{TP}$ on AC line TP is as follows:

$$V_{TP} = V\sin(t - 2\phi) \text{ for the range } 0 \leq t \leq \tfrac{\pi}{6};$$

$$= V\sin(t) \text{ for the range } \tfrac{\pi}{6} \leq t \leq \tfrac{5\pi}{6};$$

$$= V\sin(t - \phi) \text{ for the range } \tfrac{5\pi}{6} \leq t \leq \tfrac{5\pi}{2}; \text{ and}$$

$$= V\sin(t - 2\phi) \text{ for the range } \tfrac{3\pi}{2} \leq t \leq 2\pi.$$

For DC line TN, similarly, the voltage $V_{TN}$ is as follows:

$$V_{TN} = V\sin(t - \phi) \text{ for the range } 0 \leq t \leq \tfrac{\pi}{2};$$

$$= V\sin(t - 2\phi) \text{ for the range } \tfrac{\pi}{2} \leq t \leq \tfrac{7\pi}{6};$$

$$= V\sin(t) \text{ for the range } \tfrac{7\pi}{6} \leq t \leq \tfrac{11\pi}{6}; \text{ and}$$

$$= V\sin(t - \phi) \text{ for the range } \tfrac{11\pi}{6} \leq t \leq 2\pi.$$

Since at the mid-tap point T, $$V_T = \frac{V_{CP} - V_{CN}}{2} + V_{CN} = \frac{V_{CP} + V_{CN}}{2}$$

it follows that the voltage is:

$$V_T = V/2 \sin\left(t - \frac{3\phi}{2}\right) \text{ for the range } 0 \leq t \leq \tfrac{\pi}{6}$$

$$= V/2 \sin\left(t - \frac{\phi}{2}\right) \text{ for the range } \tfrac{\pi}{6} \leq t \leq \tfrac{\pi}{2}$$

$$= V/2 \sin\left(t - \frac{5\phi}{2}\right) \text{ for the range } \tfrac{\pi}{2} \leq t \leq \tfrac{5\pi}{6}$$

$$= V/2 \sin\left(t - \frac{3\phi}{2}\right) \text{ for the range } \tfrac{5\pi}{6} \leq t \leq \tfrac{7\pi}{6}$$

$$= V/2 \sin\left(t - \frac{\phi}{2}\right) \text{ for the range } \tfrac{7\pi}{6} \leq t \leq \tfrac{3\pi}{2}$$

$$= V/2 \sin\left(t - \frac{5\phi}{2}\right) \text{ for the range } \tfrac{3\pi}{2} \leq t \leq \tfrac{11\pi}{6}$$

$$= V/2 \sin\left(t - \frac{3\phi}{2}\right) \text{ for the range } \tfrac{11\pi}{6} \leq t \leq 2\pi$$

Therefore ($V_T - V_Q$) is given as follows:

$$\frac{3V}{2} \sin\left(t - \frac{7\phi}{4}\right) \text{ for the range } 0 \leq t \leq \tfrac{\pi}{6}$$

$$0 \text{ for the range } \tfrac{\pi}{6} \leq t \leq \tfrac{\pi}{2}$$

$$\frac{3V}{2} \sin\left(t - \frac{9\phi}{4}\right) \text{ for the range } \tfrac{\pi}{2} \leq t \leq \tfrac{5\pi}{6}$$

$$\frac{3V}{2} \sin\left(t - \frac{7\phi}{4}\right) \text{ for the range } \tfrac{5\pi}{6} \leq t \leq \tfrac{7\pi}{6}$$

$$0 \text{ for the range } \tfrac{7\pi}{6} \leq t \leq \tfrac{3\pi}{2}$$

$$\frac{3V}{2} \sin\left(t - \frac{9\phi}{4}\right) \text{ for the range } \tfrac{3\pi}{2} \leq t \leq \tfrac{11\pi}{6}; \text{ and}$$

$$\frac{3V}{2} \sin\left(t - \frac{7\phi}{4}\right) \text{ for the range } \tfrac{11\pi}{6} \leq t \leq 2\pi$$

Figure 6:
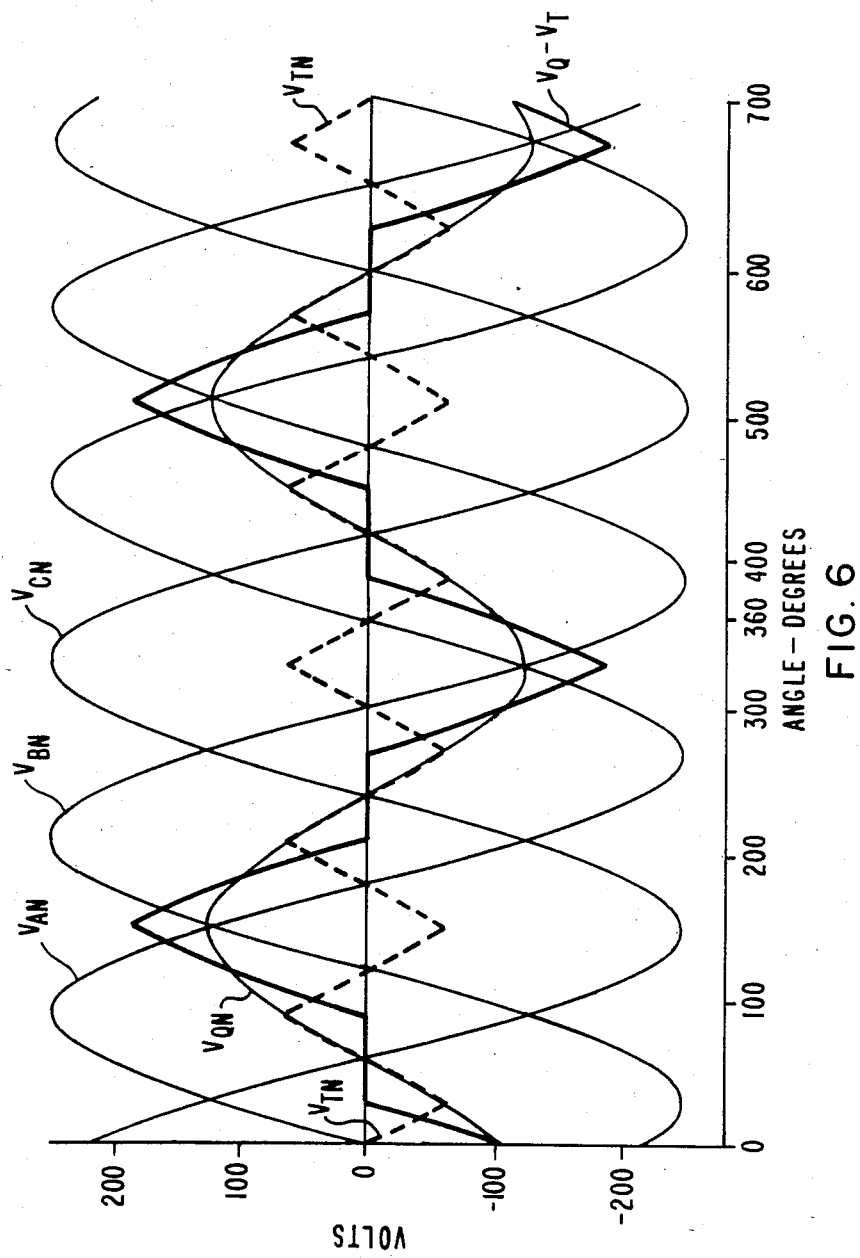
FIG. 6 illustrates with curves the voltages at key points of the circuit of FIG. 2 or 5.

Referring to the curves of FIG. 6 which show $V_{AN}$, $V_{BN}$, $V_{CN}$, the voltages $V_{QN}$, $V_{TN}$, and $V_Q-V_T$ are given in time relation with the AC input voltages.

It appears that each non-zero segment of the ($V_T-V_Q$) waveform is a portion of a sine wave. Based on the four segments of the wave involved, integration can be made by effecting four times the integration of one segment with no angular offset. This is a simplification which does not affect the result. This leads to the following formulation of the rms voltage $V_{rms}$:

$$V_{rms} = \sqrt{\frac{4}{2\pi} \int_0^{\frac{\pi}{3}} \frac{V^2 3}{4} \sin^2 t\, dt}$$

$$= V \frac{\sqrt{3}}{\sqrt{2\pi}} \sqrt{\left[\frac{1}{2} t - \frac{1}{4}\right] \sin 2t_0^{\pi/3}}$$

$$= 0.3829 V$$

Considering the average voltage $(V_{TP}-V_{TN})$ across capacitor C1 and C2: this voltage is for the peak line 2 V and for the line-to-line peak $\sqrt{3} \times \sqrt{2} \times$ V or, 2.4495 V, the rms value. Considering the power P, it is expressed as:

$$V \times I = \frac{V^2}{\text{Resistance}}$$

Figure 3A:
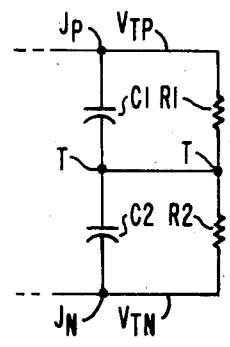
FIGS. 3A and 3B show the equivalent circuits corresponding to FIGS. 1 and 2.
Figure 3B:
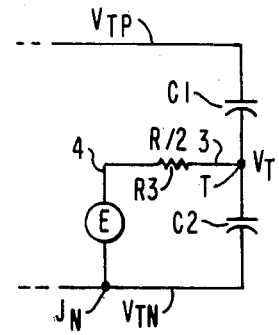

It appears that, for the prior art circuit of FIG. 3A, the resistance is 2R, and for the proposed circuit of FIG. 3B the resistance is R/2. Substituting the rms value of 0.3829 V in the latter instance and of 2.4495 V in the former instance, the formulae for the powers become:

$$P_{standard} = \frac{(2.4495\ V)^2}{2R} = \frac{3\ V^2}{R}, \text{ and}$$

$$P_{new} = \frac{(0.3829\ V)^2}{R/2} = \frac{0.2932\ V^2}{R}$$

The ratio $P_{standard}/P_{new}$ is:

$$\frac{0.2932 \frac{V^2}{R}}{\frac{3\ V^2}{R}} = \frac{0.2932}{3}$$

$$= 0.0977 \text{ or } 9.77\%.$$

This calculation demonstrates a dissipation of only 9.77% with the system of FIG. 2, as opposed to with the system of FIG. 1.

The current component due to capacitor leakage is taken into account by taking the square root of the sum of the square of the currents respectively due to the AC component and the DC leakage component. The relative advantage of the circuit of FIG. 2 may be decreasing as the capacitor leakage increases, but it will remain better than with the prior art approach of FIG. 1.

Another characteristic of the circuit according to the present invention resides in the fact that it imposes an AC current at the center tap T of the capacitor bank. If, for example, the resistor R3 would be 1500 ohms and the effective capacitance viewed from the center tap of the capacitor bank is 4800 μF, it establishes a low frequency cutoff of about 0.022 Hz, since the AC ripple imposed by the sharing network is 60 Hz. This will cause a negligible voltage ripple at this point.

More generally, the circuit according to the present invention reduces the loss associated with voltage balancing networks used with series capacitors, and it reduces both the resistor count and the size of the remaining resistor.

I claim:
1. In a static AC/DC converter, including an array of power switches mounted in a bridge across three AC terminals of a three-phase power supply and two DC output terminals, with at least two capacitors connected across said DC output about a common point, the combination of:
   means for connecting two of said three AC terminals symmetrically about a junction point representing half the resultant of the phase voltages associated with said two AC terminals, respectively; and
   resistor means interconnecting said capacitor common point and said junction point;
   whereby any leakage unbalance between said capacitors is dissipated through said resistor means.
2. The converter of claim 1 with said connecting means including an autotransformer having a middle point as said junction point.
3. The converter of claim 2 with said resistor means having a resistance in relation to the maximum current leakage between said two capacitors.
4. The converter of claim 1 with said resistor means being a resistor of resistance R/2, where R is the equivalent resistance of a set of parallel resistors mounted in parallel, each with one of said capacitors, so as to provide the same voltage balance as said parallel resistors.

* * * * *